Jan. 7, 1958
A. MARTIN
2,819,360
DEVICES FOR CONTROLLING THE POSITION OF
A MOVABLE PIECE IN ACCORDANCE WITH THE
VALUE OF A GIVEN FACTOR
Filed July 26, 1954
3 Sheets-Sheet 1
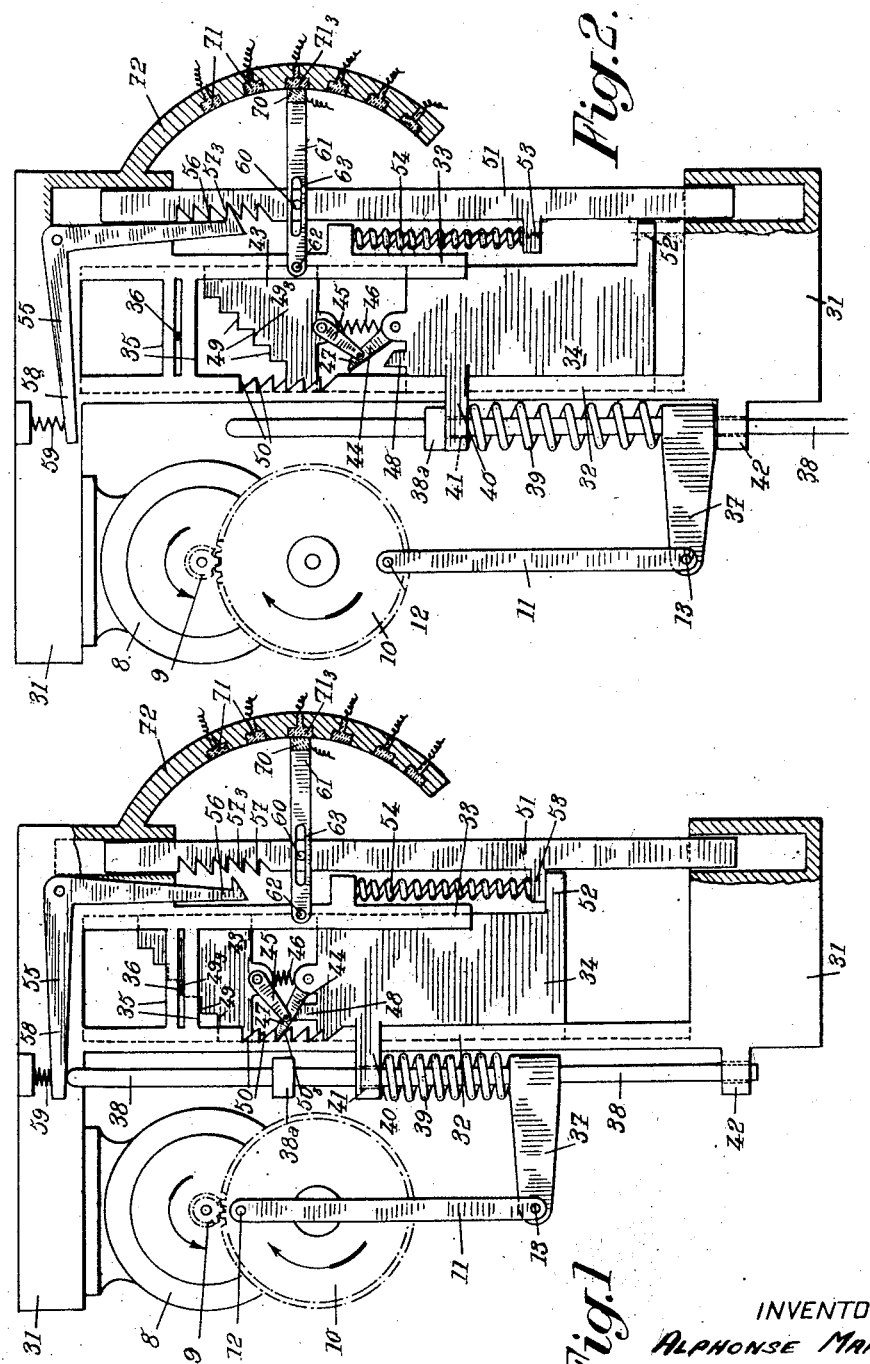
INVENTOR
ALPHONSE MARTIN
BY
Bailey, Stephens & Huettig
ATTORNEYS Jan. 7, 1958

A. MARTIN 2,819,360

DEVICES FOR CONTROLLING THE POSITION OF
A MOVABLE PIECE IN ACCORDANCE WITH THE
VALUE OF A GIVEN FACTOR

Filed July 26, 1954

INVENTOR
ALPHONSE MARTIN
BY
Bailey, Stephens & Huettig
ATTORNEYS

Jan. 7, 1958

A. MARTIN 2,819,360

DEVICES FOR CONTROLLING THE POSITION OF
A MOVABLE PIECE IN ACCORDANCE WITH THE
VALUE OF A GIVEN FACTOR

Filed July 26, 1954

INVENTOR
ALPHONSE MARTIN
BY
ATTORNEYS

United States Patent Office 2,819,360
Patented Jan. 7, 1958

2,819,360

DEVICES FOR CONTROLLING THE POSITION OF A MOVABLE PIECE IN ACCORDANCE WITH THE VALUE OF A GIVEN FACTOR

Alphonse Martin, Saint-Ouen, France

Application July 26, 1954, Serial No. 445,849

Claims priority, application France July 31, 1953

5 Claims. (Cl. 200—56)

The present invention relates to devices for controlling the position of a movable piece in accordance with the value of a given factor as indicated by the position of the index of an instrument measuring said factor.

The object of my invention is to provide a device of this kind which is better adapted to meet the requirements of practice than those used for the same purposes up to the present time.

Preferred embodiments of my invention will be hereinafter described with reference to the accompanying drawings given merely by way of example and in which:

Figs. 1 and 2 show in elevational view, with parts in section, a device according to a first embodiment of my invention, said figures corresponding respectively to two different positions of the parts of the device.

Figure 3:
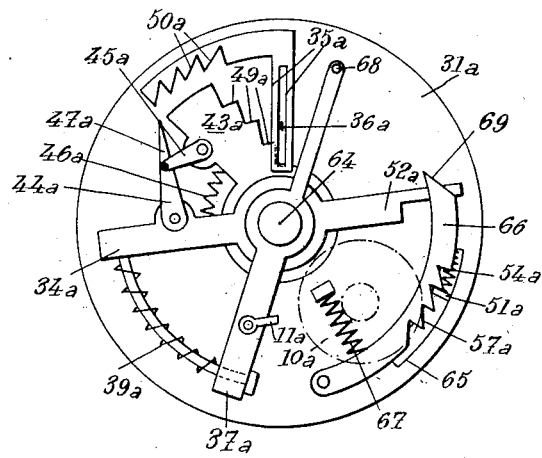
Figs. 3 and 4 are views similar to Figs. 1 and 2 respectively and illustrating a modified device according to my invention.

The device illustrated by Figs. 1 and 2 is intended to control the position of an arm 61 in accordance with the position occupied by an index 36 which is the index of an apparatus for measuring the factor above referred to, said index being pivoted about a vertical axis parallel to the plane of Figs. 1 and 2 and located behind this plane.

The device of Fig. 1 includes a fixed frame 31 provided with two guides 32 and 33 in which a support 34 is slidable. Guides 32 and 33 are interconnected by two transverse members 35 forming between them a slot in which index 36 is movable.

Support 34 is given a vertical reciprocating movement by means of an electric motor 8 which drives through a pinion 9 a toothed wheel 10 on which is journalled at 12 a connecting rod 11 the lower end of which is pivotally connected to a bar 37 rigid with a rod 38 guided with respect to frame 31 so as to be movable in any direction parallel to guides 32, 33.

Rod 38 drives support 34 through a spring 39 interposed between arm 37 and a projection 40 of support 34. This projection 40 is provided with a hole 41 through which rod 38 can slide freely. The lower end of rod 38 is guided in a projection 42 of frame 31. An abutment 38a, rigid with rod 38, is adapted to cooperate with the projection 40 to drive support 34 downwardly (Fig. 2). Thus, support 34 is driven upwardly in a resilient fashion through a spring 39 and downwardly in a positive fashion through abutment 38a.

A plate 43 is also slidable in guides 32 and 33. This plate 43 is connected to support 34 through arms 44 and 45 hinged to each other about an axis at right angles to the plane of Figs. 1 and 2 and also hinged respectively to plate 43 and support 34 about axes parallel to said first mentioned axis. A spring 46 is interposed between support 34 and plate 43 so as to transmit the upward displacements of support 34 to plate 43. This spring is calculated in such manner as to support the weight of plate 43 without allowing arms 44 and 45 to come in line with each other, the maximum angle made by these arms with each other being shown by Fig. 2. The lower arm 44 extends beyond the point where it is pivoted with the other arm 45 to form a projection 47. An abutment 48 carried by support 34 limits the movement of arm 44 in the downward direction.

The upper edge of plate 43 is provided with a plurality of steps 49 (six in the example shown by the drawings) and guide member 32 is provided with the same number of notches 50 intended to cooperate with the projection 47 of arm 44 so as to stop the upward movement of support 34 as soon as one of the steps of the upper edge of plate 43 has come into contact with movable index 36.

A rod 51 slidable in frame 31 is provided with a projection 53 adapted to cooperate with a corresponding projection 52 of support 34 so that the upward displacements of support 34 may be transmitted to rod 51. A spring 54 interposed between frame 31 and abutment 54 urges rod 51 in the downward direction.

A bent lever 55 pivoted to frame 31 has its lower end arranged in the form of a pawl 56 adapted to cooperate with notches 57 provided in rod 51, the number of these notches being equal to the number of steps 49 of plate 43. The other end 58 of lever 55 is urged downwardly by a spring 59 interposed between said lever end 58 and frame 31. The top end of rod 38 is adapted to meet said end 58 of lever 55 when rod 38 is at the end of its upward stroke.

Rod 51 carries, rigid therewith, a pin 60 engaged in a slot 63 of an arm 61 pivoted at 62 to frame 31.

This device works as follows:

It will be supposed that index 36 has just come opposite the third step (starting from the left) $49_3$ of plate 43 and that support 34 is at the lower end of its movement as shown by Fig. 2. Motor 8 drives, through pinion 9 and toothed wheel 10 rotating in the direction of the arrows, arm 37 in the upward direction, this movement being transmitted to support 34 through spring 39. The step $49_3$ of plate 43 comes to contact movable index 36 and is stopped by said index in its upward stroke. Support 34 however keeps moving upwardly, which causes arms 44 and 45 to fold up, thus engaging projection 47 in the third notch $50_3$ from the top. As a result of this, plate 43 is slightly moved downwardly so that it no longer bears upon index 36 and on the other hand support 34 is stopped in its upward movement.

If, before this, rod 51 was in a position lower than that in which its third notch from the bottom ($57_3$) is engaged by pawl 56, during the upward movement of support 34, the abutment 52 thereof has pushed upwardly the abutment 53 of rod 51 the notches of which can slide along pawl 57 until said pawl is engaged in notch $57_3$.

On the contrary if, before this, rod 51 was in a higher position, rod 51 has not yet been displaced.

Anyway, arm 37 keeps moving upwardly, together with rod 38 which at the end of its upward stroke pushes bent lever 55 so as to disengage pawl 56 from the notch 57 in which it was precedingly engaged. If before the cycle of operations which is being described, rod 51 was in a position higher than that in which its third notch $57_3$ is engaged by pawl 56, said rod 51 is now brought into this last mentioned position by the action of spring 54 which pushes rod 51 downwardly until its abutment 53 comes to rest upon the abutment 52 of rod 51.

Thus, arm 61 is given a position which depends upon the position of index 36 along the slot formed between part 35 of the frame.

During the next half-revolution of wheel 10, arm 37 is moving down until the abutment 38a of rod 38 comes into contact with projection 40. A positive action is thus exerted upon support 34 to move it downwardly. In the meantime, that is to say as soon as rod 38 has started back on its downward movement, said rod has released the end 58 of lever 55 which is then pivoted by a spring 59 so as to engage pawl 56 in the notch $57_3$ of rod 51. This rod is therefore held in the position it occupies by this pawl as long as index 36 remains in a position corresponding to step $49_3$ of plate 43.

According to the construction illustrated by Fig. 3, the support of the movable plate 43a and said plate itself are arranged in such manner as to pivot about a common axis 64.

The general principle of operation of the apparatus remains the same as in Figs. 1 and 2, the rectilinear reciprocating movement being replaced by an oscillating circular movement. The elements of Figs. 3 and 4 which correspond to those of Figs. 1 and 2 are designated by the same reference numbers with indicia a.

Figure 4:
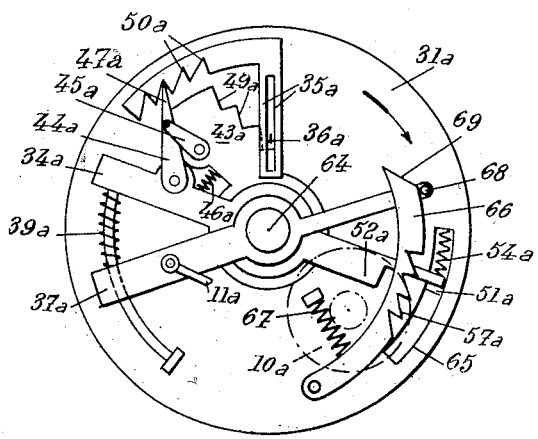

However in the construction of Figs. 3 and 4, a different mechanism is provided to actuate the piece 51a to be controlled in accordance with the position of index 36a.

This piece 51a is a slider guided in a circular groove 65 of frame 31a, this slider being urged by a pulling spring 54a in a direction opposed to that of the arrow of Fig. 4. Slider 51a is actuated by an arm 52a rigid with support 34a and it is held in position by a lever 66 pivoted to frame 31a and urged toward slider 51a by a spring 67, this lever 66 being provided with notches 57a.

The operation of this device is analogous to that described with reference to Figs. 1 and 2. At the end of every stroke of support 34a in the direction of the arrow of Fig. 4, arm 52a assumes an angular position which represents the value of the factor indicated by index 36a. Lever 66 is moved away from slider 51a by a finger 68 carried by member 37a and which cooperates with an inclined surface 69 provided at the end of said lever 66. Slider 51a is applied against arm 52a by spring 54a and it is held in the position it has been given in slot 65 by one of the notches 57a of lever 66 which has been released by finger 68.

Whatever be the embodiment that is chosen, either oscillating arm 61 in the construction of Figs. 1 and 2, or slider 51a in that of Figs. 3 and 4 is caused to operate controlling, warning or recording apparatus either directly or through a relay. This relay may be an electric one, such as illustrated for instance in Figs. 1 and 2 where oscillating arm 61 carries a sliding contact 70 cooperating with contact studs 71 the number of which is equal to that of the steps 49 of plate 43, these contact studs 71 being disposed upon an arm 72 rigid with frame 61 and in the form of a circular arc having its centre at 62. The whole is arranged in such manner that to every step 49 of plate 43 there corresponds a contact stud 71. For instance, contact stud $71_3$ corresponds to step $49_3$ as shown by Fig. 1.

The device according to the present invention may be used for instance to operate an engine regulating device, either in the case of a piston engine or of a jet engine. This device is advantageously constituted by a valve controlling the feed of fuel in accordance with a temperature at a suitably chosen point of the engine, in which case index 36 is the indicating member of a pyrometer responsive to variations of said temperature.

The regulating system can then be operated either directly by oscillating arm 61 or through a relay such as an electric relay and including for instance a structure analogous to that illustrated by Figs. 1 and 2. Of course, I might choose any kind of relay, for instance a mechanical, hydraulic, pneumatic or other relay.

The device may cooperate with a recording system, for instance by perforation of a metallic strip which cannot be destroyed or a warning device either of the light or sound type.

Figs. 5 to 9 relate to a device according to my invention intended to operate a warning device when the factor indicated by index 36 exceeds a critical value $v$ on the scale 72 of the measurement apparatus. Thus, the device according to my invention acts only in the portion of the range of displacements of the index for which said factor has a value higher than $v$.

Figure 5:
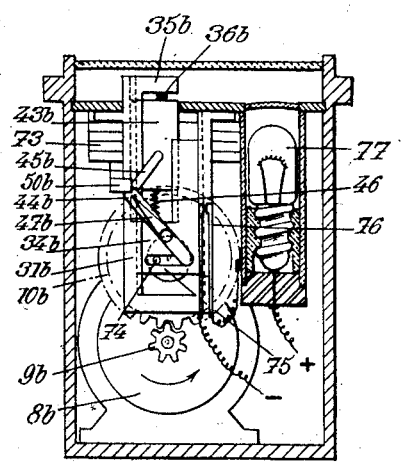
Figs. 5 and 6 are respectively a longitudinal sectional view and a plan view of an apparatus made according to another embodiment of my invention.
Figure 7:
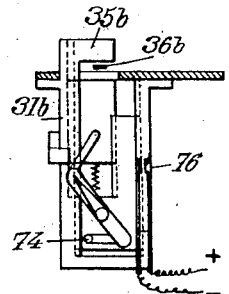
Figs. 7 to 9 show in different relative positions of operation some elements of the apparatus of Fig. 5.
Figure 6:
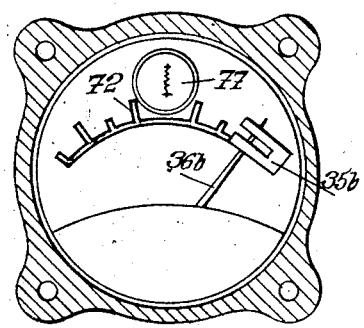

The apparatus shown by Figs. 5 and 6 is analogous to that of Figs. 1 and 2 with the difference that the plate 43b which cooperates with the index 36b is not provided with steps.

In Figs. 5 and 6, the same reference numbers (with indicia b) represent the same elements as in Figs. 1 and 2. 73 is the measurement apparatus to which index 36b belongs. Support 34b is reciprocated by toothed wheel 10b through a crank 74 carried by said wheel and engaged in a transverse slot 75 of support 34b. The end of projection 47b is in line with the hinged axis of arms 44b and 45b and abutment 50b is provided with a slot to accommodate said arms. The warning contact 76 is constituted by two resilient conductor strips which are normally at a distance from each other and which can be applied against each other by the end of arm 44b opposed to the end hinged with the other arm 45b.

Figure 8:
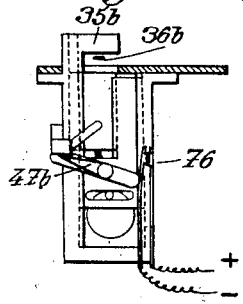
Figure 9:
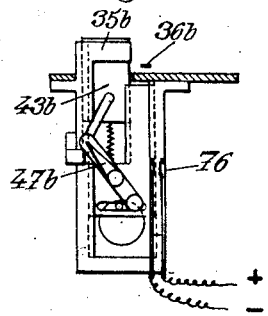

I interpose said contact in a warning circuit fed from conductors marked + and − and capable for instance of switching on a bulb 77 or a sound warning apparatus. The operation is as follows: As long as the factor (for instance a temperature) is lower than a critical value $v$, plate 43b reciprocates without coming into contact with index 36b (Fig. 9). As soon as the factor in question reaches or exceeds this critical value (Fig. 7), plate 43b comes into contact upon every reciprocation thereof with index 36b. On every contact, arms 44b and 45b close up so as to release the index from the pressure exerted by part 43b and the free end of arm 44b closes contact 76 (Fig. 8). Bulb 77 is then periodically switched on or off as long as the value of the factor is above the critical value.

This construction of the device according to my invention is advantageously adapted to measurement instruments in which the index is displaced by a torque of very low value, such for instance as pyrometers (either with wells or not) used on aircraft jet engines or to radioactive rays detectors or counters to operate warning signals.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A device of the type described which comprises, in combination, a frame, an index pivoted in said frame about an axis at least substantially at right angles to said index, said index indicating by its position the value of a given factor, a support guided in said frame reciprocable transversely to said index, a plate between said support and said index guided in said frame for sliding displacement in its own plane, said plane being at least substantially parallel to said axis and intersecting said index in at least a portion of the range of displacement thereof, resilient means interposed between said support and said plate for urging said plate away from said support so that one edge of said plate is brought into contact with said index on every reciprocation of said support, said edge forming a plurality of steps whereby the position of said plate at which it contacts said index depends upon the position of said index about its axis, said frame including a part having a wall parallel to the path of displacement of said plate, said wall being provided with a number of transverse notches equal to the number of said steps, two arms pivoted to each other in scissors-like fashion about an axis at right angles to said plate and pivoted at their free ends to said support and to said plate about axes parallel to said last mentioned axis, the arm which is pivoted to said support including an extension beyond the axis of pivoting of said two arms together, said extension ending opposite said notches, said resilient means being adjusted to keep said extension out of said notches as long as said plate is out of contact with said index but to yield and thus to allow said extension to engage one of said notches when said stepped edge of said plate comes into contact with said index, a member guided in said frame for moving with respect thereto in the same fashion as said support, motor means for imparting a reciprocating movement to said member, spring means interposed between said member and said support for resiliently transmitting to said support the movement of said member toward said index, cooperating abutment means on said member and said support for positively transmitting to said support at least a portion of the movement of said member away from said index, a piece movably mounted in said frame, cooperating means rigid with said support and said piece respectively for giving said piece a predetermined different position for every different position respectively occupied by said support at the end of its stroke toward said index and means operative by said member for keeping said piece in said position during the next reciprocation of said support and releasing it at the end of said reciprocation.

2. A device according to claim 1 in which said support and said plate are guided in said frame for rectilinear movement at right angles to the plane in which said index is movable.

3. A device according to claim 1 in which said support and said plate are guided in said frame for pivoting movement about an axis located in the plane in which said index is movable and at right angles to the pivot axis of said index.

4. A device of the type described which comprises, in combination, a frame, an index pivoted in said frame about an axis at least substantially at right angles to said index, said index indicating by its position the value of a given factor, a support guided in said frame reciprocable transversely to said index, a plate between said support and said index guided in said frame for sliding displacement in its own plane, said plane being at least substantially parallel to said axis and intersecting said index in only a portion of the range of displacement thereof, resilient means interposed between said support and said plate for urging said plate away from said support so that one edge of said plate is brought into contact with said index on every reciprocation of said support for said range of displacement of said index, said frame including an abutment, two arms pivoted to each other in scissors-like fashion about an axis at right angles to said plate and pivoted at their free ends to said support and to said plate about axes parallel to said last mentioned axis, the arm which is pivoted to said support including an extension beyond the axis of pivoting of said two arms together, said extension ending opposite said abutment, said resilient means being adjusted to keep said extension out of contact with said abutment as long as said plate is out of contact with said index but to yield and thus allow said extension to engage said abutment when said edge of said plate comes into contact with said index, an arm opposed to said extension and rigid therewith, and electric contact means operative by said arm when said extension comes into contact with said abutment.

5. In a device of the type described, a fixed frame, an element pivotally mounted in said frame about an axis, an index member movable in said frame at least substantially radially with respect to said axis, said member indicating by its position the value of a given factor, and means cooperating with said element and said index member and operated by pivoting movement of said element for locking said element against rotation with respect to the frame in one direction when said element reaches a position corresponding to the position of said member, said locking means including a first part carried by said frame and a second part operatively connected to said element adapted to engage said first part independently of said member.

References Cited in the file of this patent

UNITED STATES PATENTS

| | | |
|---|---|---|
| 1,681,309 | Paulin | Aug. 21, 1928 |
| 2,011,774 | Paulin | Aug. 20, 1935 |
| 2,123,978 | Wagner | July 19, 1938 |